(12) United States Patent
Hourtane et al.

(10) Patent No.: US 11,152,784 B2
(45) Date of Patent: Oct. 19, 2021

(54) ON-BOARD DEVICE FOR RECHARGING AN ELECTRIC VEHICLE BY CONDUCTION

(71) Applicant: ALSTOM Transport Technologies, Saint-Ouen (FR)

(72) Inventors: Jean-Luc Hourtane, Bouc Bel Air (FR); Nicolas Nevot, Ozoir la Ferriere (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 249 days.

(21) Appl. No.: 16/440,290

(22) Filed: Jun. 13, 2019

(65) Prior Publication Data

US 2019/0386487 A1    Dec. 19, 2019

(30) Foreign Application Priority Data

Jun. 13, 2018 (FR) ..................... 18 55154

(51) Int. Cl.
*H02J 1/10*   (2006.01)
*B60L 53/16*  (2019.01)
*B60L 5/42*   (2006.01)

(52) U.S. Cl.
CPC ............... *H02J 1/108* (2013.01); *B60L 5/42* (2013.01); *B60L 53/16* (2019.02)

(58) Field of Classification Search
CPC ...... H02J 1/108; H02J 2310/48; H02J 7/0029; H02J 1/08; H02J 7/00034; H02J 1/06; B60L 3/0069; B60L 5/42; B60L 53/14; B60L 53/16; Y02T 10/70; Y02T 10/72; Y02T 90/12; Y02T 90/14; Y02T 10/7072; Y02T 90/16; Y02T 10/62

USPC ......................................................... 320/109
See application file for complete search history.

(56) References Cited

U.S. PATENT DOCUMENTS

| 8,465,303 | B2 | 6/2013 | Lacour |
| 2013/0270903 | A1 | 10/2013 | Nettelblad et al. |
| 2016/0036253 | A1* | 2/2016 | Keller .................. H02J 7/0029 320/109 |

FOREIGN PATENT DOCUMENTS

| EP | 3323661 A1 | 5/2018 |
| FR | 3048387 A1 | 9/2017 |
| JP | 2012-228060 A | 11/2012 |

OTHER PUBLICATIONS

French Search Report for Application No. 1855154, dated Oct. 31, 2018 in 2 pages.

* cited by examiner

*Primary Examiner* — Paul Dinh
(74) *Attorney, Agent, or Firm* — Knobbe, Martens, Olson & Bear, LLP

(57) ABSTRACT

A device is electrically connected to first and second terminals of an energy collector and provided with first and second electrical contacts intended to be placed in contact, for the electrical supply of the energy collector, respectively with first and second conjugated electrical contacts of a supply device on the ground, in turn electrically connected to an electrical power source. The device has a mesh connecting the second electrical contact and an output terminal connected to the second terminal of the energy collector, the mesh having a diode inserted between the second electrical contact and the second terminal of the energy collector so as to avoid the circulation of a current toward the second terminal of the energy collector.

8 Claims, 1 Drawing Sheet

ON-BOARD DEVICE FOR RECHARGING AN ELECTRIC VEHICLE BY CONDUCTION

Figure 1:
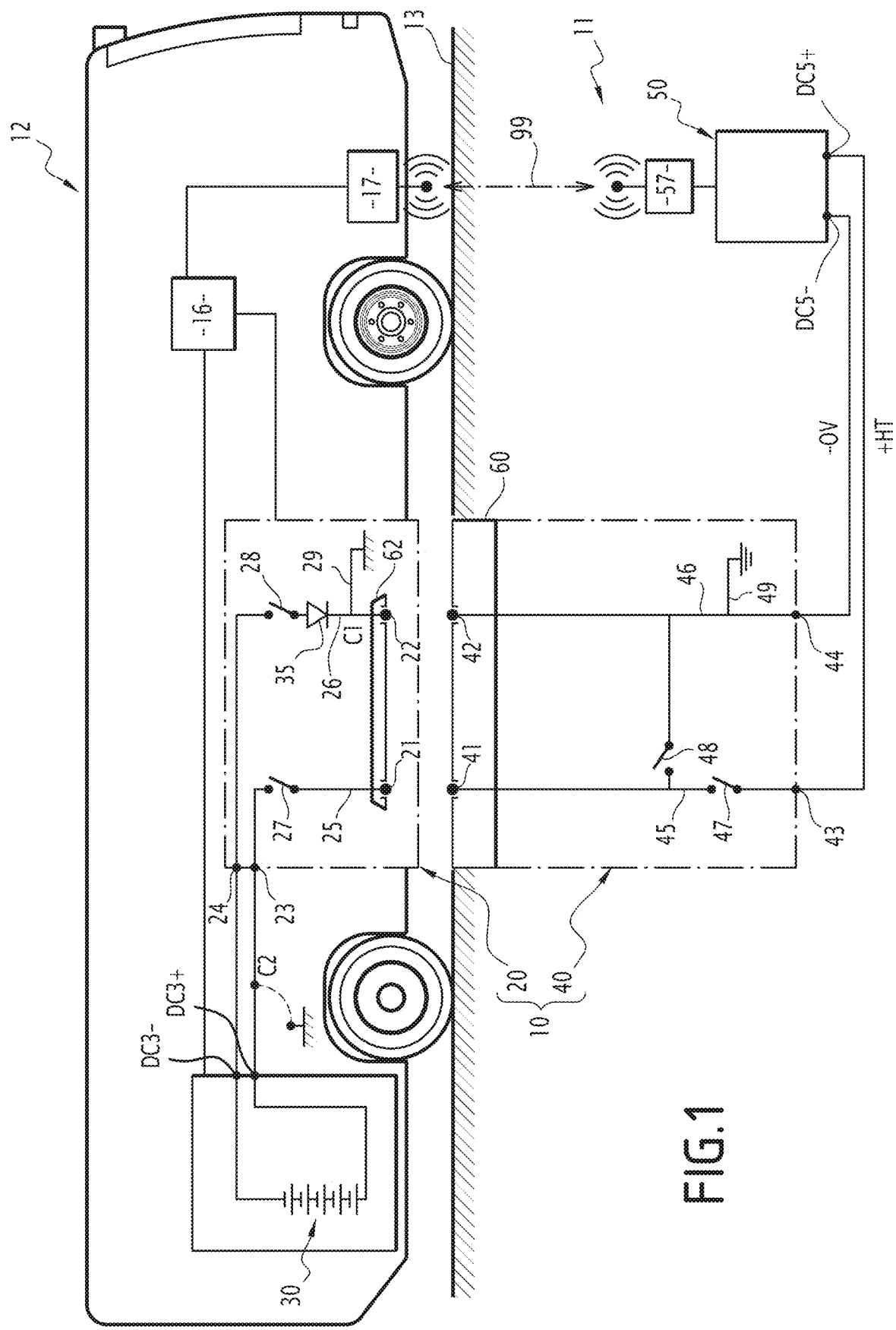

The present invention relates to the recharging by conduction of energy storage on board an electric or hybrid vehicle from a permanent recharging station.

Recharging by conduction has many advantages in particular relative to recharging by induction. It allows faster recharging, with higher efficiency, using an installation that is less complex and therefore has lower deployment and maintenance costs.

Among electric vehicles, recharging a bus by conduction has certain specificities relative in particular to the case of a railway vehicle, such as a tram. Indeed, due to the presence of tires, the chassis of a bus (and its body by electrical continuity) is normally electrically isolated from the ground.

To recharge a bus by conduction, it is currently recommended to simultaneously establish three connections between an on board device, also electrically connected to the energy storage of the electric vehicle, and a device on the ground, also electrically connected to an electric power source. A first electrical connection at a low potential, a second electrical connection at a high potential, and a third ground connection are thus established. While the first two connections make it possible to transfer electrical power between the ground and on board, the third connection makes it possible to ground the bus and thus ensure the safety of the people around the bus during recharging.

These connections result from the placement in contact of contacts provided on the on-board device and conjugated contacts provided on the device on the ground. It may for example involve connecting a male connector as on-board device and a female connector as device on the ground; placing a pantograph as on-board device and an aerial pole for the device on the ground in contact; or placing a shoegear as on-board device and contact stud implanted in the track as device on the ground in contact. It is the latter embodiment that will be more particularly used in the remainder of the present description as an illustration.

Such an installation, which requires the simultaneous establishment of three connections, is complex to manufacture and remains difficult to keep operating.

In order to simplify such an installation with three connections, document FR 3,048,387 describes a recharging installation by conduction with two connections. More specifically, the installation includes an on-board device provided with a first electrical contact at a high potential also called positive contact and a second electrical contact at a low potential, also called negative contact, and a device on the ground, conjugated to the on-board device, having a first conjugated electrical contact, also called conjugated positive contact, and a second conjugated electrical contact, also called negative conjugated contact. The negative contact is also connected to the body of the bus. The conjugated negative contact is also connected to the ground. In this way, the low potential of the conjugated negative contact is 0 V.

The positive contact and the conjugated positive contact have a potential greater than the negative contact, respectively than the conjugated negative contact.

For the recharge, each electrical contact of the on-board device is placed in contact with the conjugated electrical contact of the device on the ground and the installation verifies, at each moment of the recharging, that the body of the bus is actually at the potential of the ground. If the connection is lost between the negative contact and the conjugated negative contact, the power transfer is interrupted immediately. Thus, electrical power is transmitted on board without risk for the people located near the body of the bus, the latter being at earth potential.

However, this installation with two connections has the flaw of not being able to avoid the consequences of the malfunction described hereinafter. Normally the circuit, called positive circuit, connecting the positive contact of the on-board device and the positive terminal of the energy storage, and which is brought to the high potential during recharging, is insulated from the body of the bus. However, a malfunction can occur leading to a loss of insulation along this positive circuit. Then, at the time of recharging, a conductive loop is established between the positive and negative terminals of the energy storage through the body of the electric vehicle, the negative terminal being connected to the body via the negative contact and the positive terminal via the loss of insulation along the positive circuit. In this case, the battery is discharged and substantial currents may flow through the body. The situation presents risks for the people around the bus during recharging.

Embodiments of the present subject matter therefore aims to resolve this problem.

These embodiments therefore relate to an on-board device for an electric vehicle equipped with an electrical energy collector, the on-board device being electrically connected to a first terminal and a second terminal of the energy collector and being provided with a first electrical contact and a second electrical contact that are intended to be placed in contact, for the supply of electricity of the energy collector, respectively with a first conjugated electrical contact and a second conjugated electrical contact of a supply device, preferably on the ground, the supply device being electrically connected to an electrical power source, the on-board device having a mesh connecting the second electrical contact and an output terminal connected to the second terminal of the energy collector, the mesh having a diode inserted between the second electrical contact and the second terminal of the energy collector, the diode being able to avoid the circulation of current toward the second terminal of the energy collector through the mesh.

This on-board device is an improvement to installations with two connections, since it makes it possible to guarantee the safety of people even in case of a loss of insulation between the components of the bus brought to the high potential and the body.

According to specific embodiments, the on-board device includes one or more of the following features, considered alone or according to any technically possible combinations:
- the mesh also includes a connecting node to a body of the electric vehicle and the diode is inserted between the connecting node to the body and the second terminal;
- the diode is able to prevent the flow of current between the first terminal and the second terminal of the energy collector through the body;
- the connecting node to the body and the diode are positioned at a distance smaller than 20 m from the second electrical contact;
- the diode comprises an anode intended to be connected to the second terminal and a cathode intended to be connected to the second contact; and
- the diode comprises an anode intended to be connected to the output terminal and a cathode intended to be connected to the connecting node to the body.

Embodiments also relate to an electric vehicle incorporating the preceding on-board device. The electric vehicle is equipped with an electrical energy collector and an on-board device electrically connected to the electrical energy collector and allowing a supply by conduction of the energy collector from a recharging station, the on-board device being according to the preceding on-board device.

Preferably, the electric vehicle is a bus.

Preferably, the electrical energy collector is an electrical energy storage; and Also preferably, the vehicle includes a radio communication module able to establish a wireless communication link with a radiocommunication module with which the electrical power source is equipped.

The present subject matter and its advantages will be better understood in light of the following detailed description of one particular embodiment, provided solely as an illustrative and non-limiting example. This description is done in reference to the drawing schematically showing a recharging and more generally electrical energy collecting installation incorporating an on-board device according to the present disclosure.

The FIGURE shows a supply installation 10 by conduction allowing the safe application of electrical power delivered by an electrical power source 50 to an electrical energy collector 30.

The FIGURE in particular illustrates, as an example, a recharging installation 10 by conduction allowing the safe application of electrical power delivered by a source 50 from a permanent recharging station 11 to an electrical energy storage 30 located on board an electric vehicle, in particular a bus 12.

The source 50 is for example a traction battery charger or a power substation of an electric grid.

The electrical energy storage 30 is for example made up of a battery, but other technical solutions are known by those skilled in the art, for example supercapacitors or a flywheel.

The installation 10 is of the type with two connections, in particular between on board and the ground.

The installation 10 includes, on board the bus 12, an on-board device 20 and, in the recharging station 11 positioned outside the bus 12, in particular on the ground, a conjugated device 40 also called supply device or device on the ground.

The on-board device 20 includes two input terminals, forming two contacts, respectively a first electrical contact 21, also called positive contact, and a second electrical contact 22, also called negative contact.

The positive contact has a potential greater than the potential of the negative contact.

The on-board device 20 is connected, by two output terminals 23 and 24, to first DC3+ and second DC3+ terminals of the electrical energy storage 30, also called positive terminal DC3+ and negative terminal DC3− of the electrical energy storage 30.

The supply device, also called device on the ground 40, is connected, by two input terminals 43 and 44, to first DC5 and second DC5− terminals of the source 50, also called positive and negative terminals, DC5+ and DC5−, of the source 50.

The device on the ground 40 includes two output terminals, forming two conjugated contacts of the contacts of the on-board device 20, namely a first conjugated electrical contact, also called positive conjugated contact 41, and a second conjugated electrical contact, also called negative conjugated contact 42.

The positive conjugated contact has a potential greater than the potential of the negative conjugated contact.

In the embodiment described here in detail, the conjugated contacts 41 and 42 of the device on the ground 40 are incorporated into a contact stud 60, installed in the roadway 13 so as to have an upper surface flush with the surface of the roadway on which the bus 12 travels.

The on-board device 20 then includes a shoe 62, mounted below the body of the bus 12 and able to be moved vertically between an upper position, separated from the contact stud 60, and a lower position, in contact with the contact stud 60.

In the lower position, the positive contact 21 of the on-board device 20 is in electrical contact with the positive conjugated contact 41 of the device on the ground 40 and the negative contact 22 of the on-board device 20 is in electrical contact with the negative conjugated contact 42 of the device on the ground 40.

The device on the ground 40 includes a first mesh, also called positive mesh 45, that connects the positive conjugated contact 41 and the positive input terminal 43 connected to the positive terminal DC5+, and a negative mesh 46 that connects the negative conjugated contact 42 and the negative input terminal 44 connected to the negative terminal DC5−.

Around the negative conjugated contact 42, i.e., at a distance of less than 100 m, the negative mesh 46 is electrically connected to a ground. This is shown schematically in FIG. 1 by the ground connection 49.

As a result, the low potential of the negative components of the station 11 is 0 V and the high potential of the positive components of the station 11 is +HV, for example 900 V.

The positive mesh 45 of the device 40 is equipped with a controlled switch 47. Furthermore, a safety contactor 48 is placed between the positive mesh and the negative mesh of the device 40. The contactor 48 is used to secure the positive mesh, and is closed once the contactor 47 is opened.

The on-board device 20 includes a first mesh, also called positive mesh 25, which connects the positive contact 21 and the positive terminal DC3+ of the energy storage, and a second mesh, also called negative mesh 26, which connects the negative contact 22 and the negative terminal DC3− of the energy storage.

The positive mesh has, between the positive contact 21 and the positive output terminal 23, a positive controlled contactor 27. The contactor 27 is able to switch from an open state to a closed state and vice versa. In the closed state, an electrical continuity is established between the positive contact 23 and the positive terminal DC3+.

The negative mesh 26 has, at a distance of less than 20 m from the negative contact 22, a node C1 for electrical connection to the body of the bus 12. This is shown schematically in the FIGURE by the ground connection 29.

The negative mesh also has, between the node C1 and the negative output terminal 24, a negative controlled contactor 28. The contactor 28 is able to switch from an open state to a closed state and vice versa. In the closed state, an electrical continuity is established between the negative contact 22 and the negative terminal DC3−.

The negative mesh has, between the point C1 and the negative output terminal 24, and preferably between the point C1 and the negative controlled contactor 28, a diode 35.

The diode 35 is mounted such that its anode is connected to the negative controlled contactor 28 and its cathode, at the point C1 connected to the body of the bus 12.

The diode 35 serves to prevent the circulation of current between the positive and negative terminals of the energy storage in case of loss of insulation tween the positive mesh and the body of the vehicle or between the positive mesh and the ground.

For example, as shown in dotted lines in the FIGURE, if the diode 35 was not inserted and if the positive circuit (made up of components brought to the high potential during the recharge) was by chance connected to the body at the node C2, while the contactors 27 and 28 were closed during recharging, the positive DC3+ and negative DC3− terminals of the energy storage 30 would be short circuiting through the body of the bus 12.

However, the insertion of the diode 35 in the short-circuit loop thus created blocks the flow of any current. The energy storage means 30 is therefore no longer able to withdraw current. There is therefore no longer any risk for people in contact with the body. The situation is therefore controlled.

The bus 12 has a control-command device 16.

It also has a radio communication module 17 able to establish a wireless communication link 99 with a radio-communication module 57 with which the electrical power source 50 is equipped. This is for example a wireless link implementing a communication protocol known under the name WLAN.

When the driver wishes to recharge the energy storage 30 of the bus 12 he is driving, he brings the latter to a recharging station, like the station 11.

The driver stops the bus 12 in a predefined recharging position, indicated by suitable ground markings.

In this recharging position, the shoegear 62 is located over the contact stud 60.

When the bus 12 is stopped, the control-command device 16 initiates the recharging process by commanding the lowering of the shoegear 62 to press it against the contact stud 60.

In so doing, the positive contact 21 of the on-board device 20 comes into electrical contact with the positive conjugated contact 41 of the device on the ground 40 and the negative contact 22 of the on-board device 20 comes into contact with the negative conjugated contact 42 of the device on the ground 40.

Then, since the positive contact 41 is physically inaccessible (being located below the bus) and the chassis of the bus 12 being connected to the ground, the switch 48 is first open and the contactor 47 is next closed to establish an electrical contact between the source 50 and the on-board device 20, via the device on the ground 40.

Then, by the wireless communication link 99 between the control-command device 16 of the bus 12 and the source 50, the source 50 is informed that a connection has been established. The source 50 adapts the characteristics of the recharging current to be generated and applied to the input terminals of the device on the ground 40.

Then, the source 50 informs the control-command device 16 of the bus, via the wireless communication link 99, that the recharging can begin.

The control-command device 16 of the bus 12 then switches to close the contactors 27 and 28 of the on-board device 20 to connect the latter to the terminals of the energy storage 30.

At this moment, if the high-voltage circuit of the bus is not correctly galvanically insulated from the body, the presence of the diode 35 makes it possible to prevent any flow of current between the terminals DC3− and DC3+ of the energy storage, via the body of the bus 12. The diode 35 also makes it possible to protect the energy storage in case of short-circuit between the contacts 21 and 22.

The recharging then begins and is maintained until the driver of the bus receives a request to stop the supply.

The source 50, informed of the interruption of the supply, ceases to apply electrical power across the input terminals of the device on the ground 40. The contactors 27 and 28 are open and the device on the ground 40 switches to open the contactor 47, and close the ground contactor 48.

The shoegear 62 can then be actuated to be placed back in its upper position, before the bus leaves.

What is claimed is:

1. An on-board device for an electric vehicle equipped with an electrical energy collector, wherein the electrical energy collector is an electrical energy storage, the on-board device being electrically connected to a first terminal and a second terminal of the electrical energy collector and being provided with a first electrical contact and a second electrical contact to provide electrical power path connections for supplying electricity to the electrical energy collector respectively with a first conjugated electrical contact and a second conjugated electrical contact of a supply device, the supply device being electrically connected to an electrical power source from a recharging station, the on-board device having a mesh connecting the second electrical contact and an output terminal connected to the second terminal of the energy collector, the mesh having a diode inserted between the second electrical contact and the second terminal of the electrical energy collector, the diode is for avoiding a circulation of a current toward the second terminal of the electrical energy collector through the mesh, wherein the mesh also includes a connecting node for the connection to a body of the electric vehicle and the diode is inserted between the connecting node and the second terminal.

2. The device according to claim 1, wherein the diode prevents the flow of a current between the first terminal and the second terminal of the electrical energy collector through the body.

3. The device according to claim 1, wherein the connecting node and the diode are positioned at a distance smaller than 20 m from the second electrical contact.

4. The device according to claim 1, wherein the diode comprises an anode connected to the second terminal and a cathode connected to the second contact.

5. The device according to claim 1, wherein the diode comprises an anode connected to the output terminal and a cathode connected to the connecting node.

6. An electric vehicle equipped with an electrical energy collector and an on-board device electrically connected to the electrical energy collector and being for supplying by conduction the electrical energy collector from a recharging station, wherein the on-board device is a device according to claim 1.

7. The electric vehicle according to claim 6, wherein the electric vehicle is a bus.

8. The electric vehicle according to claim 6, wherein the vehicle comprises a radio transceiver capable for establishing a wireless communication link with a radio transceiver with which the electrical power source is equipped.

* * * * *